United States Patent [19]

Kurobe

[11] Patent Number: 5,109,391
[45] Date of Patent: Apr. 28, 1992

[54] UNBALANCED TRANSMITTER AND RECEIVER

[75] Inventor: Akio Kurobe, Moriguchi, Japan

[73] Assignee: Matsushita Electric Industrial Co., Ltd., Kadoma, Japan

[21] Appl. No.: 497,016

[22] Filed: Mar. 21, 1990

[30] Foreign Application Priority Data

Dec. 18, 1989 [JP] Japan .................... 1-327883

[51] Int. Cl.$^5$ .......................................... H04L 25/34
[52] U.S. Cl. ............................. 375/17; 375/36; 307/270
[58] Field of Search ............... 375/17, 36, 59; 341/55, 341/56; 307/270, 473

[56] References Cited

U.S. PATENT DOCUMENTS

| 3,476,879 | 11/1968 | Zenner | 375/17 |
|---|---|---|---|
| 3,818,360 | 6/1974 | Bountmy et al. | 375/17 |
| 4,007,382 | 2/1977 | Warberg | 307/236 |
| 4,063,235 | 12/1977 | Ludwig | 341/56 |
| 4,236,256 | 11/1980 | Brackett et al. | 341/57 |
| 4,337,457 | 6/1982 | Tache | 455/608 |
| 4,412,141 | 10/1983 | Jacobsen | 375/17 |
| 4,620,310 | 10/1986 | Lvovsky et al. | 307/270 |
| 4,679,209 | 7/1987 | Hogeboom et al. | 375/17 |
| 4,922,249 | 5/1990 | Cointot et al. | 341/57 |

FOREIGN PATENT DOCUMENTS 61-49535 3/1986 Japan .
63-193745 8/1988 Japan .

Primary Examiner—Stephen Chin
Attorney, Agent, or Firm—Cushman, Darby & Cushman

[57] ABSTRACT

A transmitter and a receiver for an unbalanced transmission line are constituted by omitting pulse transformers, but in the transmitter by installing switching circuits ($S_1$, $S_4$) directly coupled to the unbalanced transmission line (306 or 306') through respective switching devices (305, 310), and in the receiver by installing a pair of input circuits comprising D.C. isolating capacitors (503, 505) and bias circuits (502, 504) for uninverted and inverted input terminals (+,−), in receiver parts (525, 526) for positive polarity pulses and negative polarity pulses, respctively.

3 Claims, 7 Drawing Sheets

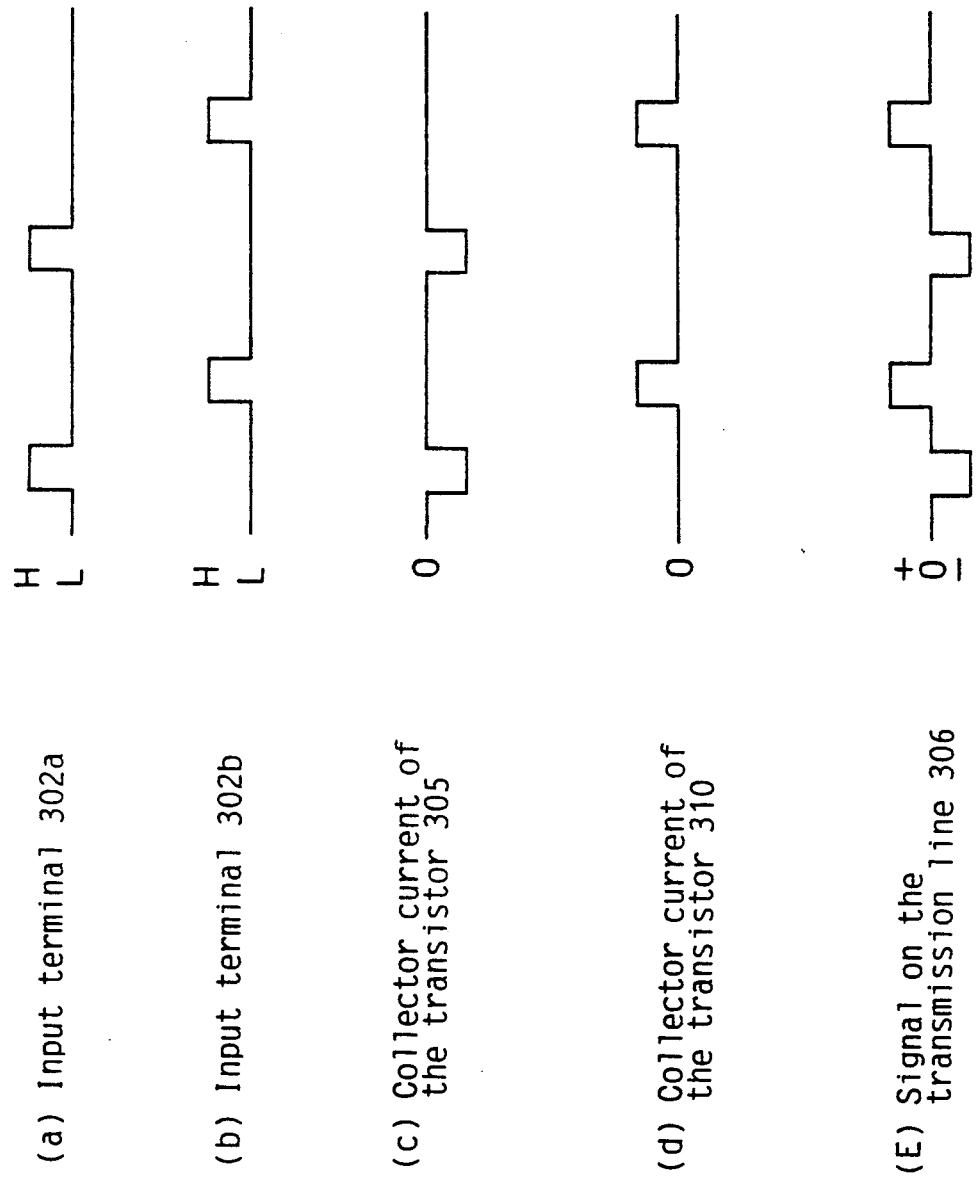

/ocr/5109391-p1.md

UNBALANCED TRANSMITTER AND RECEIVER

FIELD OF THE INVENTION AND RELATED ART STATEMENT

1. Field of the Invention

The present invention relates to an improvement in a transmitter for transmitting bipolar signals to an unbalanced information transmission medium and receivers to receive such bipolar signals.

2. Description of the Related Art

FIG. 1 shows one example of the conventional transmitter utilizing a pulse transformer to transmit the bipolar signal to an unbalanced signal transmission line. In FIG. 1, a signal output circuit 130 issues signals through a first and a second output lines 130a and 130b, and through resistors 134 and 135, to the bases of a pair of transistors $Tr_1$ and $Tr_2$, respectively. First winding of a pulse transformer 133 is connected through a pair of lines 133a and 133b to the collectors of the transistors $Tr_1$ and $Tr_2$, respectively, and by its center tap to a D.C. power source 137. The power source 137 is also connected to feed power to the signal output circuit 130. Second winding of the pulse transformer 133 is connected by one end thereof to a center conductor of a coaxial cable 138, which is an unbalanced transmission line, and by the other end thereof to the outer conductor of the coaxial cable 138. The first transistor $Tr_1$ is for switching a negative pulse to the center conductor of the coaxial cable 138 and the other transistors $Tr_2$ is for switching a positive pulse to the center conductor of the coaxial cable 138, when their bases receive positive signal through the signal output lines 130a and 130b, respectively. The emitters of both transistors $Tr_1$ and $Tr_2$ are grounded.

The operation of the conventional circuit of FIG. 1 is elucidated as follows. The output terminals 130a and 130b of the signal output circuit 130 are normally at low levels. When the output terminal 130b is high (by a pulse from the signal output circuit 130), the transistor $Tr_2$ is turned on, and when the output terminal 130a is high (by a pulse from the signal output circuit 130), the transistor $Tr_1$ is turned on. When the transistor $Tr_2$ is turned on, current flows in the first winding of the pulse transformer 133 in a direction from the center tap to the lower output end 133b, and thereby current 136a from the ground through the second winding of the pulse transformer 133 and to the center conductor of the coaxial cable 138 is produced; and thereby a positive polarity current is given to the transmission line 138. On the contrary, when a high level output is given on the output terminal 130a and to the base 131 of the first transistor $Tr_1$, then the transistor 131 is turned on thereby allowing a current to flow from the center tap of the first winding of the pulse transformer 133 to the collector of the first transistor $Tr_1$, and hence inducing a secondary current to flow from the center conductor of the coaxial cable through the second winding and to the ground. Therefore, the negative polarity pulse is given to the transmission line 138.

In the above-mentioned conventional transmitter using the pulse transformer, there has been the following problem. Since, generally, a number of transmitter of the same constitution are connected to the transmission line, provided that the number of the parallelly connected transmitters is N and the inductance of each pulse transformer seen from the transmission line is L, the overall inductance on the transmission line becomes L/N. Accordingly, when the number N of parallel connected transmitters increases, the smallness of the inductance L/N result in a considerable low inductive load on the transmission line. Therefore, the bipolar signal is differentiated by such load of low inductance, thereby producing a considerable sag or back-swings after each pulse as shown in FIG. 2(b). If the voltage of the back-swing exceeds a threshold level, the bipolar system makes bit error.

Since the amount of the sags and back-swings are proportional to the pulse width in general, these sags and back-swings can be suppressed by decreasing pulse duty ratio retaining the same transmission speed. However, such way of decreasing the pulse duty ratio will cause a problem that tolerance of transmission delay time becomes smaller as the pulse width becomes smaller. Therefore, such way of suppressing of the sags and back-swings by smallness of the pulse duty ratio results in limit of the length (distance) of the line of the system.

On the other hand, there may be another way of decreasing the sags or back-swings such that inductance per each pulse transformer is increased by use of a high permeability core. But, such transformer having the high permeability core is expensive, and further, an increase of number of turn of coil in the pulse transformer necessarily increase size, output impedance and stray capacitance of the winding of the pulse transformer, which also increase transmission delay time of the bipolar signal.

OBJECT AND SUMMARY OF THE INVENTION

In order to solve the above-mentioned problem, the unbalanced transmitter for bipolar signal in accordance with the present invention comprises:

a signal output circuit for controlling outputting of positive polarity pulses and negative polarity pulses by receiving input signals for the positive polarity pulses and the negative polarity pulses, a pair of switching means each comprising a switching device, a capacitor and a diode, for outputting the positive polarity pulse or the negative polarity pulse to an unbalanced transmission line, the switching device being controlled in synchronism with said input signals of the signal output circuit.

A receiver in accordance with the present invention comprises:

a pair of comparators each having an uninverted input terminal and an inverted input terminal whereto uninverted input signal and inverted input signals are to be applied through capacitors, respectively; and a pair of bias voltage means for each comparator each of which gives each-other different bias voltage to the uninverted input terminal and the inverted input terminal of the comparator;

output terminals of said pairs of comparator being commonly led out to form a bipolar output line.

According to the transmitter of the present invention, sendind of the bipolar signals to and from the unbalanced transmission line can be made without using the hitherto used pulse transformer.

According to the receiver of the present invention, by appropriately selecting the bias voltages given to the uninverted and inverted terminals of the comparators, the voltage ranges of the same phase input voltage and tolerable values of the differential input voltage can be arbitrarily set, and only a single DC power source suffices. And the input impedances can be designed by selecting the value of resistors to be connected between the transmission line and the input terminals of the comparators. Furthermore, the receiver in accordance with the present invention can be applied to a bus system without particular limit of number to be connected, because there is no pulse transformer connected at the input end.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 4 is a wave form chart showing the operation of the embodiment of FIG. 3.

DESCRIPTION OF THE PREFERRED EMBODIMENT

Transmitter

Figure 1:
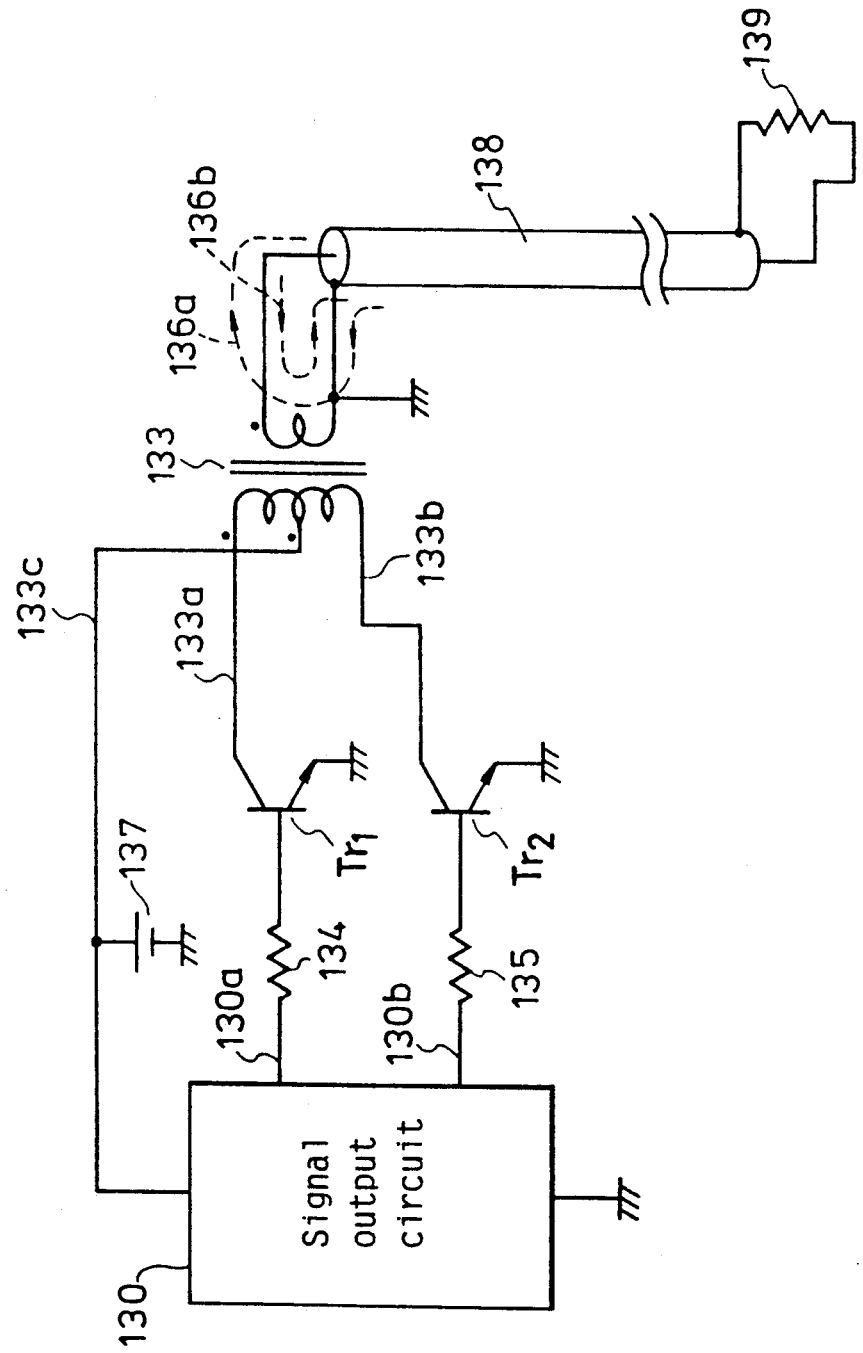
FIG. 1 is the circuit diagram of the prior art transmitter.
Figures 2A, 2B:
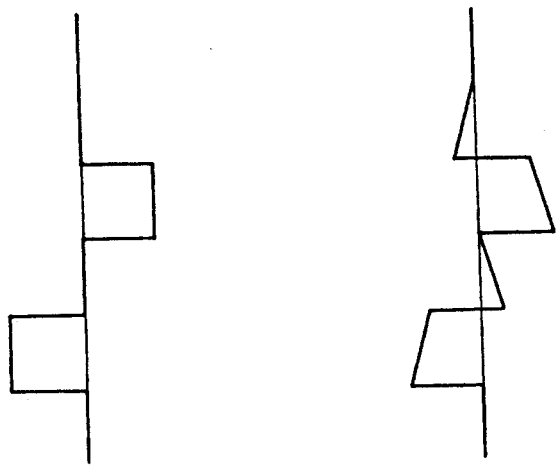
FIG. 2(a) and FIG. 2(b) are wave form charts of the prior art transmitter.
Figure 3:
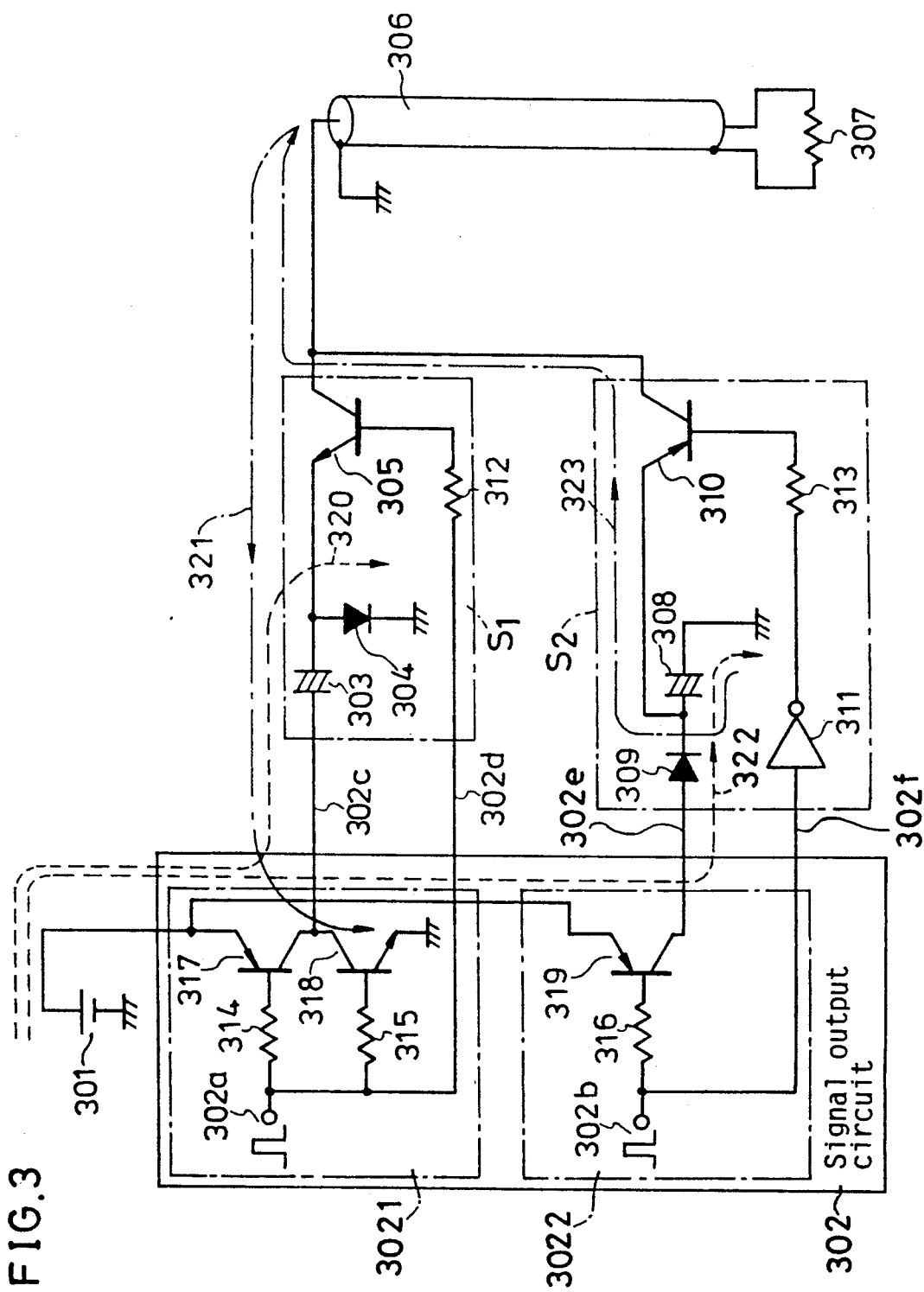
FIG. 3 is a circuit diagram of the transmitter embodying the present invention.

FIG. 3 shows one example of a transmitter embodying the presnet invention. As shown in FIG. 3, a signal output circuit 302 comprises a negative pulse signal output part 3021 and a positive pulse signal output part 3022. The negative signal output circuit 3021 comprises a series circiut of a PNP transistor 317 and an NPN transistor 318 connected across both ends of a D.C. power source 301. The collectors of both transistors 317 and 318 are commonly connected to an output line 302c, and their bases are connected through resisters 314 and 315 commonly to a negative input terminal 302a, respectively. The positive signal output circuit 3022 comprises a single PNP type transistors 319, collector thereof being connected to another output line 302e. The base of the transistor 319 is connected through a resister 316 to a positive pulse signal input terminal 302b. The output lines 302c and 302e are connected, through a first switching circuit $S_1$ and a second switching circuit $S_2$, to a center conductor of a coaxial transmission line 306.

In the first switching circuit $S_1$, the emitter of the NPN transistor 305 is connected to the signal output line 302c through a capacitor 303, and also is connected to an anode of a cathode-grounded diode 304. The base of the NPN transistor 305 is connected through a resistor 312 to the first input terminal 302a of the first signal output circuit 3021. In the second switching circuit $S_2$, the emitter of the PNP transistor 310 is connected to the signal output line 302e through the diode 309 whose anode is connected to the collector of the transistor 319 of the second signal output circuit 3022, and also is grounded through a capacitor 308. The base of the PNP transistor 310 is connected through a resistor 313 and an inverter 311 to the second signal output circuit 3022.

The collectors of the NPN transistor 305 of the first switching circuit 305 and the PNP transistor 310 of the second transistor are commonly connected to the center conductor of the coaxial line 306.

The operation of the circuit of FIG. 3 is as follows. The input terminal 302a is normally at low level (hereinafter is referred to as L), whereby the transistor 317 is ON and the transistor 318 is OFF, thereby charging the capacitor 303 through the diode 304 by a current 320, to give a higher potential to the side of the output line 302c than the side of the cathode-grounded diode 304. At that time, the emitter-collector circuit of the transistor 305 if OFF since the line 302d to the input terminal 302a is L. When the input terminal 302a turns to high level (hereinafter is referred to as H), the transistors 317 and 318 turn OFF and ON, respectively, thereby turning the signal output line 302c to L. At the same time, the line 302d turns H, and hence the transistors 305 turns ON, thereby allowing the charge stored in the capacitor 303 discharge therethrough, hence inducing a current 321 from the center conductor of the coaxial line 306 through the transistor 318 to the ground. By this current 321, a negative polarity pulse is transmitted to the transmission line 306.

The input terminal 302b is also normally L, whereby the transistor 319 is ON, and the capacitor 308 is charged by a current 322 through the diode 309 to the ground. Therefore, a higher potential than the ground is given to the side of the cathode of the diode 309. Since the input terminal is L, the output of the inverter 311 is H, and hence the transistor 310 is OFF. When the input terminal 302b turns H, the transistor 319 is turned OFF; and at the same time the line 302f becomes H, and at the same time, the base of the transistor 310 is turned to L, and the transistor 310 turns ON. Therefore the charge stored in the capacitor 308 is discharged by a current 323 from the diode cathode side through the emitter-collector circuit of the transistor 310 to the center conductor of the coaxial line 306. By this current 323, a positive polarity pulse is transmitted to the transmission line 306.

According to the above-mentioned configuration, there is no fear of producing sags or back-swings due to the differentiation by low inductive load on the transmission line, since transmitter of the present invention uses no pulse transformer to be connected to the transmission line. Besides, there is no delay of the transmitted signal since no inductive element is used in the above-mentioned transmitter. Furthermore, since the transmitter is made without transformer or inductive device, it is possible to integrate on an IC a large number of the transmitter within a very small size.

Receiver

Figure 4A:
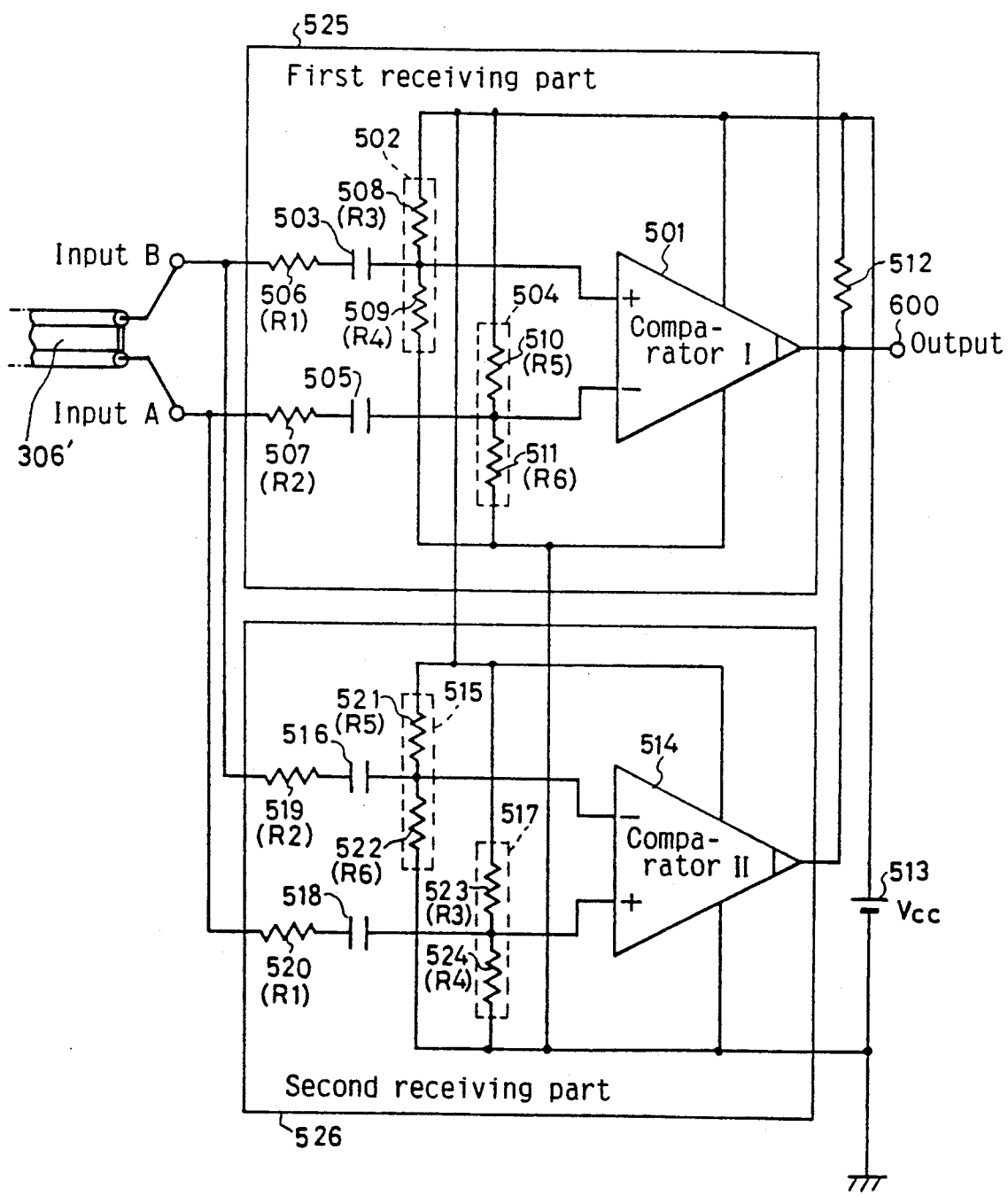
FIG. 4A and FIG. 5 are circuit diagram of the receiver embodying the present invention.

FIG. 4A shows a preferred embodiment of a receiver in accordance with the present invention.

The receiver comprises a first receiving part 525 and a second receiving part 526. The first receiving part 525 comprises a first comparator 501 to whose uninverted input terminal (+) an input signal from a balanced input terminal B is led through a resistor 506 ($R_1$) and a capacitor 503. To inverted input terminal (−) of the first comparator 501 an input signal from the other balanced input terminal A is led through a resistor 507 ($R_2$) and a capacitor 505. The input terminals A and B are connected to a pair of conductors of a balanced transmission line 306'. A bias circuit 502 consisting of a pair of resistors 508 ($R_3$) and 509 ($R_4$) is connected to the uninverted input terminal (+), and another bias circuit 504 consisting of a first resistor 510 ($R_5$) and a second resistor 511 ($R_6$) is connected to the inverted input terminal (−).

The second receiving part comprises a second comparator 514, to whose uninverted input terminal (+) an input signal from the input terminal A is led through a resistor 520 ($R_1$) and a capacitor 518. To inverted input terminal (−) of the second comparator 514 an input signal from the input terminal B is led through a resistor 519 ($R_2$) and a capacitor 516. A bias circuit 515 consisting of a pair of resistors 521 ($R_5$) and 522 ($R_6$) is connected to the inverted input terminal (−), and another bias circuit 517 consisting of a first resistor 523 ($R_3$) and a second resistor 524 ($R_4$) is connected to the uninverted input terminal (+).

The output terminals of the first comparator 501 and the second comparator 514 are commonly connected to a positive terminal of the DC power source 513 through a resistor 512 and directly to an output terminal 600. The connection of the resistor 512, the first comparator 501 and the second comparator 514 constitute a wired OR output circuit by pulling up the open collector outputs of the comparators 501 and 514.

<Operation With A Balanced Transmission Line>

The operation of the receiver illustrated with reference to FIG. 4A is as follows. The receiver can be used for both a balanced transmission line and an unbalanced transmission line. In order to elucidate easily, first, the case of application for the balanced transmission line is described. Now, let us provide that the voltage of the DC power source is Vcc, the first bias circuit applies a first bias voltage $V_{b1} = Vcc \cdot R_4/(R_3+R_4)$ to the uninverted input terminal (+) and the second bias circuit 504 applies a second bias voltage $V_{b2} = Vcc \cdot R_5/(R_5+R_6)$ to inverted input terminal (−); and that amplitude of input signal to the first input terminal A is $V_A$ and amplitude to the second input terminal B is $V_B$. Then, the amplitude of the signal at the uninverted input terminal (+) of the first comparator 501 is given as:

$$V_{(+)} = V_B \cdot \frac{R_3 \cdot R_4}{R_3 + R_4} / \left( R_1 + \frac{R_3 \cdot R_4}{R_3 + R_4} \right). \tag{1}$$

And the inverted input terminal (−) of the first comparator 501 is given as:

$$V_{(-)} = V_A \cdot \frac{R_5 \cdot R_6}{R_5 + R_6} / \left( R_2 + \frac{R_5 \cdot R_6}{R_5 + R_6} \right). \tag{2}$$

The comparator 501 compares the input signals to its uninverted input terminal (+) and inverted input terminal (−). Then, when the voltage applied to the uninverted input terminal (+) is higher than that to the inverted input terminal (−), H output is issued to the output end of the comparator 501. On the contrary, when the voltage applied to the uninverted input terminal (+) is lower than that to the inverted input terminal (−), L output is issued to the output end.

Therefore, the condition that the first comparator 501 issues L output is:

$$V_A \cdot \frac{R_5 \cdot R_6}{R_5 + R_6} / \left( R_2 + \frac{R_5 \cdot R_6}{R_5 + R_6} \right) - V_B \cdot \frac{R_3 \cdot R_4}{R_3 + R_4} / \left( R_1 + \frac{R_3 \cdot R_4}{R_3 + R_4} \right) + Vcc \cdot \frac{R_5}{R_5 + R_6} - Vcc \frac{R_4}{R_3 + R_4} > 0. \tag{3}$$

That is:

$$(V_A - V_B) > Vcc \cdot \beta/\alpha \tag{4},$$

where:

$$\alpha = \frac{R_5 \cdot R_6}{R_5 + R_6} / \left( R_2 + \frac{R_5 \cdot R_6}{R_5 + R_6} \right)$$
$$= \frac{R_3 \cdot R_4}{R_3 + R_4} / \left( R_1 + \frac{R_3 \cdot R_4}{R_3 + R_4} \right) \tag{5}$$
$$\beta = \frac{R_5}{R_5 + R_6} - \frac{R_4}{R_3 + R_4}$$

Similarly, in the second receiving part 526, the wiring configuration is the same as the first receiving part except that the uninverted input terminal (+) and the inverted input terminal (−) are connected oppositely to the first comparator 501. Therefore, in the second receiving part 526, the condition that the second comparator 514 issues L output is $$(V_A - V_B) < Vcc \cdot \beta/\alpha \tag{6}.$$

And the condition that the second comparator 514 issues H output is:

$$(V_A - V_B) > Vcc \cdot \beta/\alpha \tag{7}.$$

Because the first comparator circuit 501 and the second comparator circuit 514 constitute a wired OR circuit, the condition that the output terminal 600 issues L (low) output is:

$$(V_A - V_B) < -Vcc \cdot \beta/\alpha \tag{8}$$

or $$(V_A - V_B) > Vcc \cdot \beta/\alpha \tag{9}.$$

On the other hand, since the first comparator circuit 501 and the second comparator circuit 514 constitute a wired OR circuit, the condition that the output terminal 600 issues H (high) output is:

$$-Vcc \cdot \beta/\alpha < V_A - V_B < Vcc \cdot \beta/\alpha \tag{10}.$$

Figure 6:
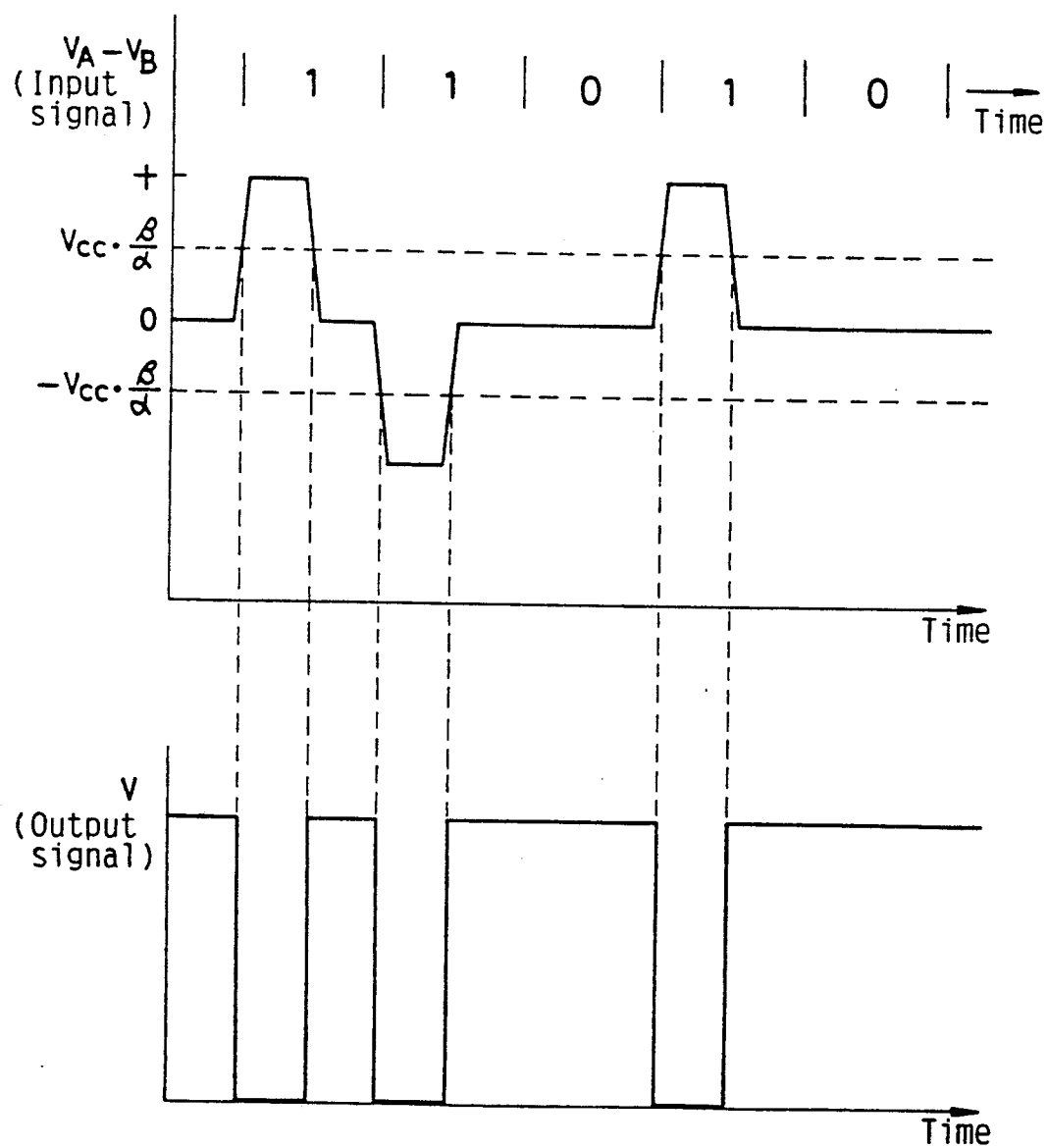
FIG. 6 is a wave form chart illustrating the operation of the embodiment receiver of FIG. 5.

This means that the receiver of FIG. 4A performs the operation of FIG. 6 with regard to the bipolar input signal from its balanced input terminals B and A. In other words, the receiver of FIG. 4A can receive the bipolar signal transmitted through the balanced transmission line under a fixed threshold value.

<Operation with Unbalanced Transmission Line>

Figure 5:
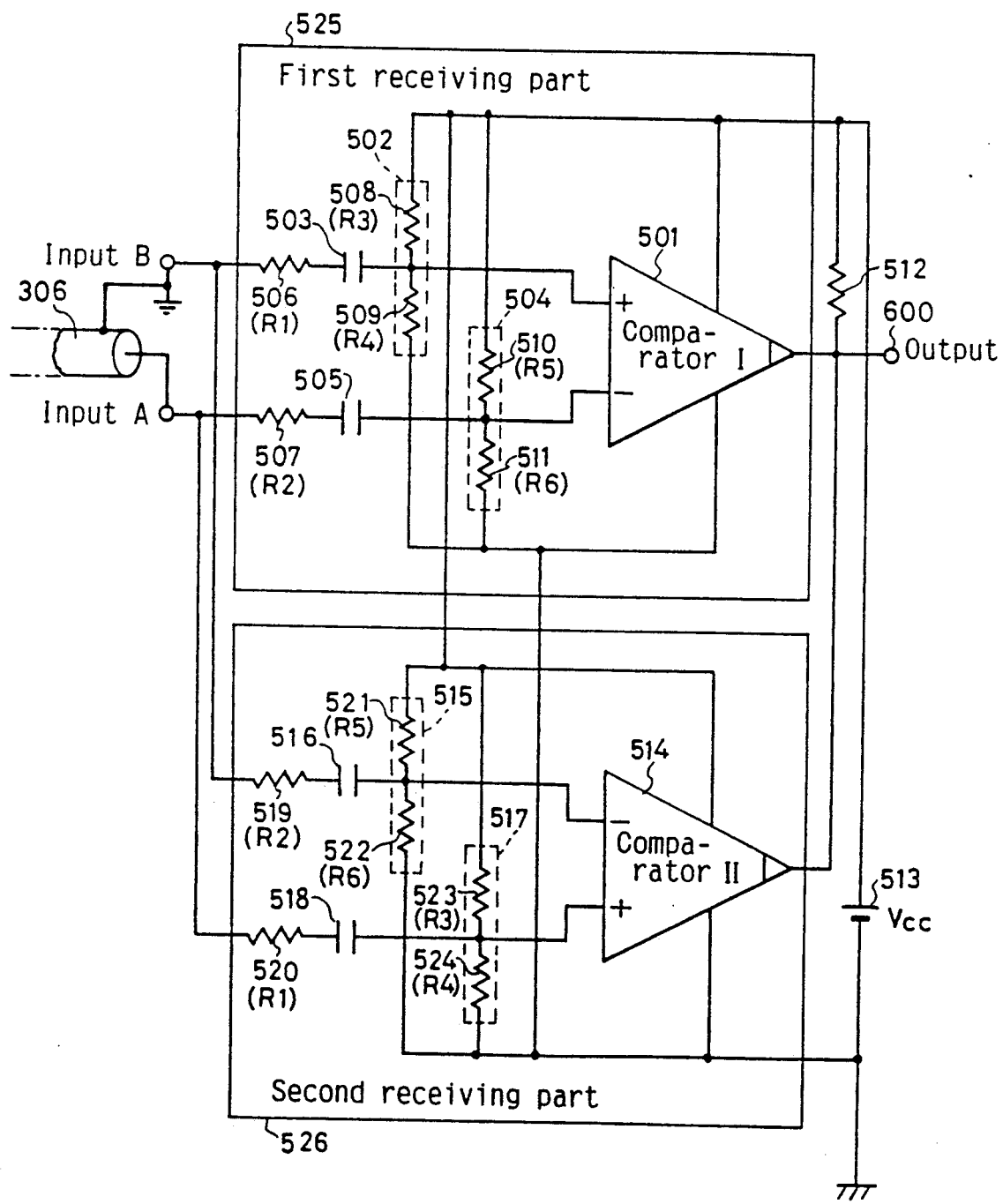

The receiver in accordance with the present invention can be used also for an unbalanced transmission line 306, whose center conductor is connected to a first input terminal A and whose outer conductor is connected to the other input terminal B. In this case, since the input terminal B is grounded as shown in FIG. 5, the input voltage $V_B=0$; and therefore, in order to issue L output signal at the terminal 600, the condition is:

$$V_A < -Vcc \cdot \beta/\alpha \quad (11)$$

or $$V_A > Vcc \cdot /\alpha \quad (12).$$

Under this condition, the receiver in accordance with the present invention can be applied for an unbalanced transmission line. In this case, since the input terminal B is grounded, the input voltage $V_B=0$, and therefore, the condition to issue H output signal at the terminal 600 is:

$$-Vcc \cdot \beta/\alpha < V_A < Vcc \cdot \beta/\alpha \quad (13).$$

This means that the receiver of FIG. 5 can receive the bipolar signal transmitted on the unbalanced transmission line with the two threshold values of $Vcc \cdot \beta/\alpha$ and $-Vcc \cdot \beta/\alpha$.

When the receiver of the above-mentioned embodiment of FIG. 5 is used for an unbalanced transmission line 306, the resistors 506 and 519 and the capacitors 503 and 516 can be omitted.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An unbalanced transmitter for bipolar signals comprising:
    a signal output circuit for controlling outputting of positive polarity pulses and negative polarity pulses by receiving input signals for said positive polarity pulses and said negative polarity pulses, and
    a pair of switching means each comprising a switching device, a capacitor and a diode, for outputting said positive polarity pulses by discharging an electric charge charged in said capacitor from a voltage corresponding to a power source voltage to a voltage across terminals of said diode into a bus line or outputting said negative polarity pulses by discharging the electric charge charged in said capacitor from a voltage corresponding to the power source voltage to the voltage across both terminals of said diode into ground through a bus line to an unbalanced transmission line, such tht said positive polarity pulse and said negative polarity pulse have substantially equal voltages and for maintaining an output impedance of said switching means at a high impedance while the pulse is not output, said switching device being controlled in synchronism with said input signals of said signal output circuit.

2. An unbalanced receiver for a bipolar signal comprising:
    a pair of receiving parts each having:
        a comparator for comparing input voltages given to its uninverted input port and its inverted input port,
        a first bias circuit for applying afirst D.C. bias to said uninverted input port,
        a first capacitor connected by one end thereof to said uninverted input port,
        a second bias circuit for applying a second D.C. bias to said inverted input port, and
        a second capacitor connected by one end thereof to said inverted input port,
    the other end of said first capacitor of said first receiving part and the other end of said second capacitor of said second receiving part being connected to a first input terminal to be connected to a first conductor of a transmission line,
    the other end of said second capacitor of said first receiving part and the other end of said first capacitor of said second receiving part being connected to a second input terminal to be connected to a second conductor of said transmission line,
    said first bias voltage and said second bias voltage being set to be different from each other and to be two threshold voltages of bipolar signals to be transmitted on said transmission line.

3. An unbalanced transmitter for bipolar signals comprising:
    a signal output circuit for generating a signal having positive polarity pulses and negative polarity pulses,
    a first capacitor connected to a first output point for said positive polarity pulses of said signal output circuit,
    a first diode grounded by its cathode and connected by its anode to the other end of said first capacitor,
    a first switching device for switching a negative polarity current from the junction point between said capacitor and said anode of said first diode to a transmission line to be connected to this unbalanced transmitter,
    a first synchronizing circuit for synchronizingly controlling switching of said first switching device,
    a second diode connected by its anode to a second output point for said negative polarity pulses of said signal output circuit,
    a second capacitor connected between a cathode of said second diode and ground,
    a second switching device for switching a positive polarity current from the junction point between the cathode of said second diode and said second capacitor to said transmission line,
    a second synchronizing circuit for synchronizing controlling switching of said second switching device, and
    a D.C. power source connected across said ground and a power feeding point of said signal output circuit.

* * * * *